United States Patent
Moir et al.

(10) Patent No.: US 12,288,196 B2
(45) Date of Patent: Apr. 29, 2025

(54) SHARDED PERMISSIONED DISTRIBUTED LEDGERS

(71) Applicant: Oracle International Corporation, Redwood City, CA (US)

(72) Inventors: Mark S. Moir, Wellington (NZ); Harold Carr, Salt Lake City, UT (US); Maurice P. Herlihy, Brookline, MA (US); Isaac Sheff, Ithaca, NY (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/638,504

(22) Filed: Apr. 17, 2024

(65) Prior Publication Data
US 2024/0265358 A1    Aug. 8, 2024

Related U.S. Application Data

(63) Continuation of application No. 18/058,616, filed on Nov. 23, 2022, now Pat. No. 11,989,704, which is a (Continued)

(51) Int. Cl.
*G06Q 20/06*    (2012.01)
*G06F 16/27*    (2019.01)
(Continued)

(52) U.S. Cl.
CPC ......... *G06Q 20/0655* (2013.01); *G06F 16/27* (2019.01); *G06Q 20/3825* (2013.01); (Continued)

(58) Field of Classification Search
CPC .......... G06Q 20/0655; G06Q 20/3825; G06Q 20/3827; G06Q 2220/00; G06F 16/27; (Continued)

(56) References Cited

U.S. PATENT DOCUMENTS

| | | |
|---|---|---|
| 6,671,821 B1 | 12/2003 | Castro et al. |
| 8,230,253 B2 | 7/2012 | Butterworth |

(Continued)

FOREIGN PATENT DOCUMENTS

| | | |
|---|---|---|
| CN | 104217362 | 12/2014 |
| CN | 104951935 | 9/2015 |

(Continued)

OTHER PUBLICATIONS

Baruch Awerbuch, et al., "Robust Random Number Generation for Peer-to-Peer Systems," Part of the Lecture Notes in Computer Science book series (LNCS, vol. 4305), 2006, pp. 1-15.

(Continued)

*Primary Examiner* — Clifford B Madamba
(74) *Attorney, Agent, or Firm* — Robert C. Kowert; Kowert, Hood, Munyon, Rankin & Goetzel, P.C.

(57) ABSTRACT

A sharded, permissioned, distributed ledger may reduce the amount of work and communication required by each participant, thus possibly avoiding scalability bottlenecks that may be inherent in previous distributed ledger implementations and possibly enabling the use of additional resources to translate to increased throughput. A sharded, permissioned, distributed ledger may be made up of multiple shards, each of which may also be a distributed ledger and which may operate in parallel. Participation within a sharded, permissioned, distributed ledger may be allowed only with permission of an authority. A sharded, permissioned, distributed ledger may include a plurality of nodes, each including a dispatcher configured to receive transaction requests from clients and to forward received requests to verifiers configured to append transactions to individual ones of the shards.

20 Claims, 7 Drawing Sheets

Related U.S. Application Data continuation of application No. 16/988,039, filed on Aug. 7, 2020, now Pat. No. 11,538,003, which is a continuation of application No. 15/605,689, filed on May 25, 2017, now Pat. No. 10,740,733.

(51) Int. Cl.
  *G06Q 20/38*  (2012.01)
  *H04L 9/00*  (2022.01)
  *H04L 9/32*  (2006.01)

(52) U.S. Cl.
  CPC ....... *G06Q 20/3827* (2013.01); *H04L 9/3239* (2013.01); *H04L 9/3247* (2013.01); *G06Q 2220/00* (2013.01); *H04L 9/50* (2022.05); *H04L 2209/56* (2013.01)

(58) Field of Classification Search
  CPC ....... H04L 9/3239; H04L 9/3247; H04L 9/50; H04L 2209/56
  USPC .......................................................... 705/44
  See application file for complete search history.

(56) References Cited

U.S. PATENT DOCUMENTS

| | | | |
|---|---|---|---|
| 9,171,044 | B2 | 10/2015 | Schleimer et al. |
| 9,667,720 | B1 | 5/2017 | Bent et al. |
| 9,811,546 | B1 | 11/2017 | Bent et al. |
| 10,009,044 | B1 | 6/2018 | Lazier |
| 10,102,265 | B1 | 10/2018 | Madisetti et al. |
| 10,291,707 | B1 | 5/2019 | Lin et al. |
| 10,740,733 | B2 | 8/2020 | Moir et al. |
| 11,538,003 | B2 | 12/2022 | Moir et al. |
| 2003/0055903 | A1 | 3/2003 | Freed |
| 2005/0038801 | A1 | 2/2005 | Colrain et al. |
| 2011/0282832 | A1 | 11/2011 | Rishel et al. |
| 2012/0254175 | A1 | 10/2012 | Horowitz et al. |
| 2012/0324472 | A1 | 12/2012 | Rossbach et al. |
| 2013/0073436 | A1 | 3/2013 | Luk et al. |
| 2013/0290249 | A1* | 10/2013 | Merriman ............. G06F 16/278 707/610 |
| 2013/0311441 | A1 | 11/2013 | Erdogan et al. |
| 2014/0108421 | A1 | 4/2014 | Isaacson et al. |
| 2014/0122510 | A1 | 5/2014 | Namkoong et al. |
| 2015/0103383 | A1 | 4/2015 | Dowling et al. |
| 2015/0227521 | A1 | 8/2015 | Levari et al. |
| 2015/0254325 | A1 | 9/2015 | Stringham |
| 2015/0341422 | A1 | 11/2015 | Farnlof et al. |
| 2016/0191509 | A1 | 6/2016 | Bestler et al. |
| 2016/0321751 | A1 | 11/2016 | Creighton, IV et al. |
| 2016/0335310 | A1 | 11/2016 | Lahiri et al. |
| 2017/0032010 | A1 | 2/2017 | Merriman |
| 2017/0046792 | A1 | 2/2017 | Haldenby et al. |
| 2017/0048216 | A1 | 2/2017 | Chow et al. |
| 2017/0075941 | A1 | 3/2017 | Finlow-Bates |
| 2017/0124556 | A1 | 5/2017 | Seger, II |
| 2017/0132625 | A1 | 5/2017 | Kennedy |
| 2017/0140375 | A1 | 5/2017 | Kunstel |
| 2017/0236120 | A1 | 8/2017 | Herlihy et al. |
| 2017/0278186 | A1* | 9/2017 | Creighton, IV ..... G06Q 20/401 |
| 2017/0337534 | A1 | 11/2017 | Goeringer et al. |
| 2017/0359374 | A1 | 12/2017 | Smith et al. |
| 2018/0006813 | A1 | 1/2018 | Van Der Leest et al. |
| 2018/0068130 | A1 | 3/2018 | Chan |
| 2022/0284129 | A1 | 9/2022 | Buldas et al. |
| 2023/0089896 | A1 | 3/2023 | Moir et al. |
| 2023/0342774 | A1 | 10/2023 | Buldas et al. |

FOREIGN PATENT DOCUMENTS

| | | |
|---|---|---|
| CN | 105488665 | 4/2016 |
| CN | 106302720 | 1/2017 |
| WO | 2016046820 | 3/2016 |

OTHER PUBLICATIONS

Jörg Becker, et al, "Can we Afford Integrity by Proof-of-Work?," ERCIS, pp. 1-28.

Christopher Copeland and Hongxia Zhong. "Tangaroa: a byzantine fault tolerant raft." http://www.scs.stanford.edu/14au-cs244b/labs/projects/copeland_zhong.pdf, 2016, pp. 1-5.

Cormen, et al., "Introductions to Algorithms," Third Edition, the MIT Press, 2009, pp. 1-1313.

Ittay Eyal, et al, "Bitcoin-NG: A Scalable Blockchain Protocol," This paper is included in the Proceedings of the 13th USENIX Symposium on Networked Systems Design and Implementation (NSDI '16), Mar. 16-18, 2016, pp. 1-16.

Eleftherios Kokoris Kogias, et al, "Enhancing Bitcoin Security and Performance with Strong Consistency via Collective Signing," This paper is included in the Proceedings of the 25th USENIX Security Symposium Aug. 10-12, 2016, Austin, TX, pp. 1-19.

Ralph C. Merkle, "A Digital Signature Based on a Conventional Encryption Function," 1998 Springer-Verlag, pp. 1-10.

Satoshi Nakamoto, "Bitcoin: A Peer-to-Peer Electronic Cash System," 2008, pp. 1-9.

Miguel Castro, et al., "Practical Byzantine Fault Tolerance," Appears in the Proceedings of the Third Symposium on Operating Systems Design and Implementation, New Orleans, USA, Feb. 1999, pp. 1-14.

Loi Luu, et al., "A Secure Sharding Protocol for Open Blockchains," 2016 Copyright held by the owner/author(s). Publication rights licensed to ACM, pp. 1-14.

Diego Ongaro, et al., "In Search of an Understandable Consensus Algorithm," This paper is included in the Proceedings of USENIX ATC '14: 2014 USENIX Annual Technical Conference, Jun. 19-20, 2014, pp. 1-16.

Arhag, "Addressing Nothing-at-Stake concerns in POS consensus systems", Retrieved from URL: https://bitsharestalk.org/index.php?action=printpage;topic=6638.0 on May 31, 2016, Posted on Aug. 4, 2014, pp. 1-13.

Gilles Brassard, et al., "Minimum Disclosure Proofs of Knowledge", Journal of Computer and System Sciences 37, 1988, pp. 156-189.

Miguel Castro, "Practical Byzantine Fault Tolerance", In Proceedings of the Third Symposium on Operating Systems Design and Implementation, OSDI '99, 1999, pp. 173-186.

Nicolas T. Courtois, et al., "On Subversive Miner Strategies and Block Withholding Attack in Bitcoin Digital Currency", arXiv preprint arXiv:1402.1718, 2014, pp. 1-15.

Paul Snow, et al., "Business Processes Secured by Immutable Audit Trails on the Blockchain", Retrieved from https://github.com/FactomProject/FactomDocs/blob/master/Factom_Whitepaper.pdf., Nov. 17, 2014, pp. 1-38.

M. Hearn, "The resolution of the bitcoin experiment", Retrieved from URL: https://medium.com/@octskyward/the-resolution-of-the-bitcoin-experiment-dabb30201f7#.a55y4fshb on May 31, 2016, pp. 1-16.

Ahmed Kosba, et al., "Hawk: The Blockchain Model of Cryptography and Privacy-Preserving Smart Contracts", 2015, pp. 1-31, University of Maryland and Cornell University.

Satoshi Nakamoto, "Bitcoin: A Peer-to-Peer Electronic Cash System", www.cryptovest.co.uk, Oct. 31, 2008, pp. 1-9.

Jae Kwon, "Tendermint: Consensus without Mining", URL http://tendermint. com/docs/tendermint {_} v04. pdf, 2014, pp. 1-11.

Wenting Li et al, "Towards Scalable and Private Industrial Blockchains", Proceedings of the ACM workshop on blockchain, Cryptocurrencies and Contracts, dated Apr. 2, 2017, pp. 9-14.

Kyle Croman et al, "On Scaling Decentralized Blockchains", dated Aug. 31, 2016, Medical Image computing and computer-assisted intervention-Miccai 2015: 18th International Conference, Munich, Germany, Oct. 5-9, 2015, Proceedings; (Lecure Notes in Computer Science;Lect.Notes Computer) Springer International Publishing, CH, pp. 1-20.

Tien Tuan Anh Dinh, et al., "Blockbench: A Framework for Analyzing Private Bockchains", arviXiv:1703.04057v1, Mar. 12, 2017, pp. 1-16.

(56) References Cited

OTHER PUBLICATIONS

International Search Report and Written Opinion from PCT/US2018/032943, dated May 25, 2017, Oracle International Corporation, pp. 1-6.

Gencer, Adam et al., "Short Paper: Service-Oriented Sharding for Blockchains", Cornell Univerity, from https://www.researchgate.net/publication/322000850_Short_Paper_Service-Oriented_Sharding_for_Blockchains, Apr. 2017.

Luu, Loi et al., "A Secure Sharding Protocol for Open Blockchains", CCS '16: Proceedings of the 2016 ACM SIGSAC Conference on Computer and Communications Security (2016), from http://people.cs.georgetown.edu/-cnewport/teaching/cosc841-spring19/papers/new/sharding.pdf, (Year: 2016).

Creighton, Rhett, "Domus Tower Blockchain (Draft)", from https://pdfs.semanticscholar.org/559c/38d908521cd0772aa070619bf93a706c011e.pdf, Mar. 28, 2016, (Year: 2016).

SharPer: Sharding Permissioned Blockchains Over Network Clusters, Amiri et al., Feb. 16, 2020 (Year: 2020).

Office Action mailed Jan. 20, 2023 in Chinese Patent Application No. 201880043371.4, Amazon Technologies, Inc., pp. 1-17 (including translation).

Saikat Chakrabarti, et al., "An Efficient and Scalable Quasi-Aggregate Signature Scheme Based on LFSR Sequences," IEEE Transactions on Parallel and Distributed Systems, vol. 20, No. 7, Jul. 2009, pp. 1059-1072.

Gencer, et al. "Short Paper: Service Oriented Sharding for Blockchain," ResearchGate, Cornel University, pp. 1-9, 2017.

Office Action mailed Jan. 15, 2024 in European Patent Application No. 18733014.7, Oracle International Corporation., pp. 1-10.

George Danezis et al: "Centrally Banked Cryptocurrencies", IACR, International Association for Cryptologic Research, Dec. 18, 2015, pp. 1-14, vol. 20151218:092419.

Eleftherios Kokoris-Kogias et al: "OmniLedger: A Secure, Scale-Out, Decentralized Ledger", IACR, International Association for Cryptologic Research, May 11, 2017, pp. 1-17, vol. 20171010:135000, Retrieved from the Internet:URL:http://eprint.iacr.org/2017/406.pdf [retrieved on May 11, 2017].

* cited by examiner

SHARDED PERMISSIONED DISTRIBUTED LEDGERS

This application is a continuation of U.S. patent application Ser. No. 18/058,616, filed Nov. 23, 2022, which is a continuation of U.S. patent application Ser. No. 16/988,039, filed Aug. 7, 2020, now U.S. Pat. No. 11,538,003, which is a continuation of U.S. patent application Ser. No. 15/605,689, filed May 25, 2017, now U.S. Pat. No. 10,740,733, which are hereby incorporated by reference herein in their entirety.

BACKGROUND

Field of the Disclosure

This disclosure relates generally to distributed ledgers, and more particularly to sharded permissioned distributed ledgers.

Description of the Related Art

Traditionally, distributed ledgers (including blockchains) typically do not scale: throughput is fundamentally limited by the need for all participants to communicate, process and store all transactions. As a result, additional resources often do not translate to improved throughput. A ledger may be considered an append-only data structure that records a sequence of transactions. A distributed ledger may be a ledger that is maintained by a collection of nodes following a common protocol to agree on successive transactions. Clients may submit transactions to one or more of the nodes. Some distributed ledgers may aggregate transactions into blocks, referred to as blockchains. Each transaction, or block of transactions, may include a hash (e.g., a cryptographic hash) of the previous transaction in the ledger, thereby minimizing the risk of the ledger being tampered with. In other words, no one (or no node) may surreptitiously add, remove or alter transactions because this would also alter all subsequent hashes. Bitcoin™ is one well-known example of a distributed ledger.

Traditionally, many blockchain and distributed ledger systems do not scale well. The term "blockchain" is used herein to refer to distributed ledgers generally, even if they are not literally represented as chains of blocks. Their throughput may be limited by a requirement that a large fraction of participants (i.e., weighted by resources in some cases) must receive, validate and store all transactions. As a result, additional resources often do not translate to improved throughput.

Permissionless blockchains may typically be deliberately inefficient, such as by ensuring that participants must expend energy in order to contribute to maintaining the ledger. Permissionless ledgers, such as Bitcoin™, generally allow any node willing to follow the protocol to participate. Anybody can propose transactions and anyone can participate in the protocols that decide which transactions are entered into the ledger. By contrast, in permissioned implementations, only certain nodes may participate. For instance, an authority may control which nodes can participate in a permissioned ledger. This authority could take various forms, such as a single organization, a consortium, etc. Permissioned ledgers may be considered to facilitate governance, such as by providing an orderly procedure for updating the ledger protocol, or for compliance with "know your customer" financial regulations.

An honest node may be considered a node that faithfully follows the system's protocols, while nodes that are dishonest, that is, those that are under the control of an adversary, may deviate from the protocol in order to seek some advantage.

Permissioning often enables behavior by dishonest nodes to be associated with the identities that own or are responsible for them, and thus opens the possibility to hold them accountable. This may be achieved by technical and/or nontechnical means. For example, if a node provably misbehaves, the protocol may enable penalties to be applied automatically, such as by confiscating an escrowed security deposit, or excluding the dishonest node from further participation. Alternatively, or additionally, evidence of misbehavior may inform a legal, regulatory or business process, enabling judgments of guilt and determination of penalties to be made outside the system.

Of course, multiple completely independent blockchains may be used. In the case of permissionless blockchains, this approach may be problematic because, except for a small number of the most popular blockchains, most will have few resources dedicated to maintaining them, and in which case it may be easy to overwhelm them with modest resources, undermining their integrity.

Two ways of reducing pressure on a blockchain are lightning networks and side chains. In both cases, participants interact "off chain" and execute transactions on the blockchain only occasionally. While these approaches may help mitigate the load on a blockchain, they do not change the fact that the primary chain does not scale.

Both permissionless and permissioned decentralized ledgers may be susceptible to manipulation by participants who favor some transactions over others. Central to most ledger protocols may be a consensus algorithm used to establish a universally agreed-upon sequence of transactions. While many distributed ledgers do not actually solve the traditional consensus problem, they are still generally referred to as implementing a consensus algorithm. Some prior consensus algorithms are based on a proof-of-work (PoW) system, in which participants expend resources to solve cryptographic puzzles. However, PoW has two well-known drawbacks. Traditionally, PoW may be wasteful and slow, deliberately designed to consume non-negligible amounts of energy, and to limit the rate at which transactions can be appended to the ledger. This approach aims to limit the influence of unknown entities, and its costs may be avoided in permissioned ledgers. PoW consensus provides only probabilistic guarantees. Generally, the ledger of a PoW consensus protocol may fork if two or more participants simultaneously append distinct transactions to the chain. Eventually, all but one of these incompatible chains may be abandoned, but there may be a period in which it is uncertain which will survive. As a result, a transaction may be considered trustworthy only after a sufficient number of later transactions have been appended after it (e.g., ensuring that the ledger has either not forked or that this transaction survived the fork and was not abandoned).

The risk and delay associated with PoW consensus can be avoided in permissioned ledgers, because participants are explicitly authorized, so there is no need to limit participation by unknown entities. This opens possibilities for a variety of consensus mechanisms that are not applicable in permissionless ledgers.

For instance, a consensus mechanism for permissioned distributed ledgers is Practical Byzantine Fault Tolerance (PBFT), in which participants propose and vote on transactions (or blocks thereof) to be appended to the ledger. PBFT may ensure that honest participants agree on valid additions to the ledger provided that a certain percentage (e.g., more than ⅔) of the participants are honest. Put differently, PBFT may ensure correctness provided fewer than a certain percentage (i.e., ⅓) of participants are dishonest, referred to as being Byzantine, e.g., they depart from the protocol and behave arbitrarily. However, PBFT generally requires $O(n^2)$ messages for n nodes to reach agreement, which may be considered to prevent scalability to large numbers of nodes, even if transactions are batched into blocks.

Another consensus algorithm involves a leader appending transactions to its ledger and broadcasting these to other participants, which add them to their ledgers and send confirmation to the leader. One example of such a consensus algorithm is Raft. Once the leader has confirmations from a majority of participants, the transactions are considered committed. In case the leader becomes unresponsive, other participants can initiate an election to choose a new leader. In the common case, Raft requires only $O(n)$ messages to reach agreement, so it is more scalable to large numbers of nodes than PBFT. However, Raft does not tolerate Byzantine failures. For example, it allows participants to impersonate each other, allows a corrupt leader to deceive others, etc. Thus, it may not be directly suitable for use in distributed ledger implementations.

SUMMARY

Methods, techniques, apparatus and systems for implementing sharded, permissioned, distributed ledgers are described. A sharded, permissioned, distributed ledger, as described herein, may reduce the amount of work and communication required by each participant, thus possibly avoiding scalability bottlenecks that may be inherent in previous distributed ledger implementations and possibly enabling the use of additional resources to translate to increased throughput. The methods, techniques and/or mechanisms described herein may provide an approach to implementing scalable infrastructure for supporting ledgers made up of multiple "shards", each of which may be considered, and may be implemented as, a distributed ledger in its own right. In some embodiments, multiple shards may operate in parallel.

Participation within a sharded, permissioned, distributed ledger may be allowed only with permission of an authority, such as a consortium, in some embodiments. Permission by an authority may allow the trust implied by such permissioning decisions to be exploited, while never trusting anyone or anything completely. Such permissioning may also be exploited to possibly ensure that participants who misbehave can be detected and held accountable via any of various mechanisms, both technical and nontechnical, according to various embodiments.

The methods, techniques and/or mechanisms described herein may provide an opportunity for a system implementing a sharded, permissioned, distributed ledger to dictate desired behavior (e.g., to determine which participants actively maintain a given shard at any point in time), and/or to hold accountable those that fail to comply (e.g., fail to comply with the ledger protocol and/or consensus algorithm). A sharded, permissioned, distributed ledger, as described herein, may utilize (and/or include) a scalable infrastructure that virtualizes provision of services by decoupling shards from the participants that manage them, thereby possibly allowing for capacity and workloads to grow independently of each other, according to some embodiments.

Figure 1:
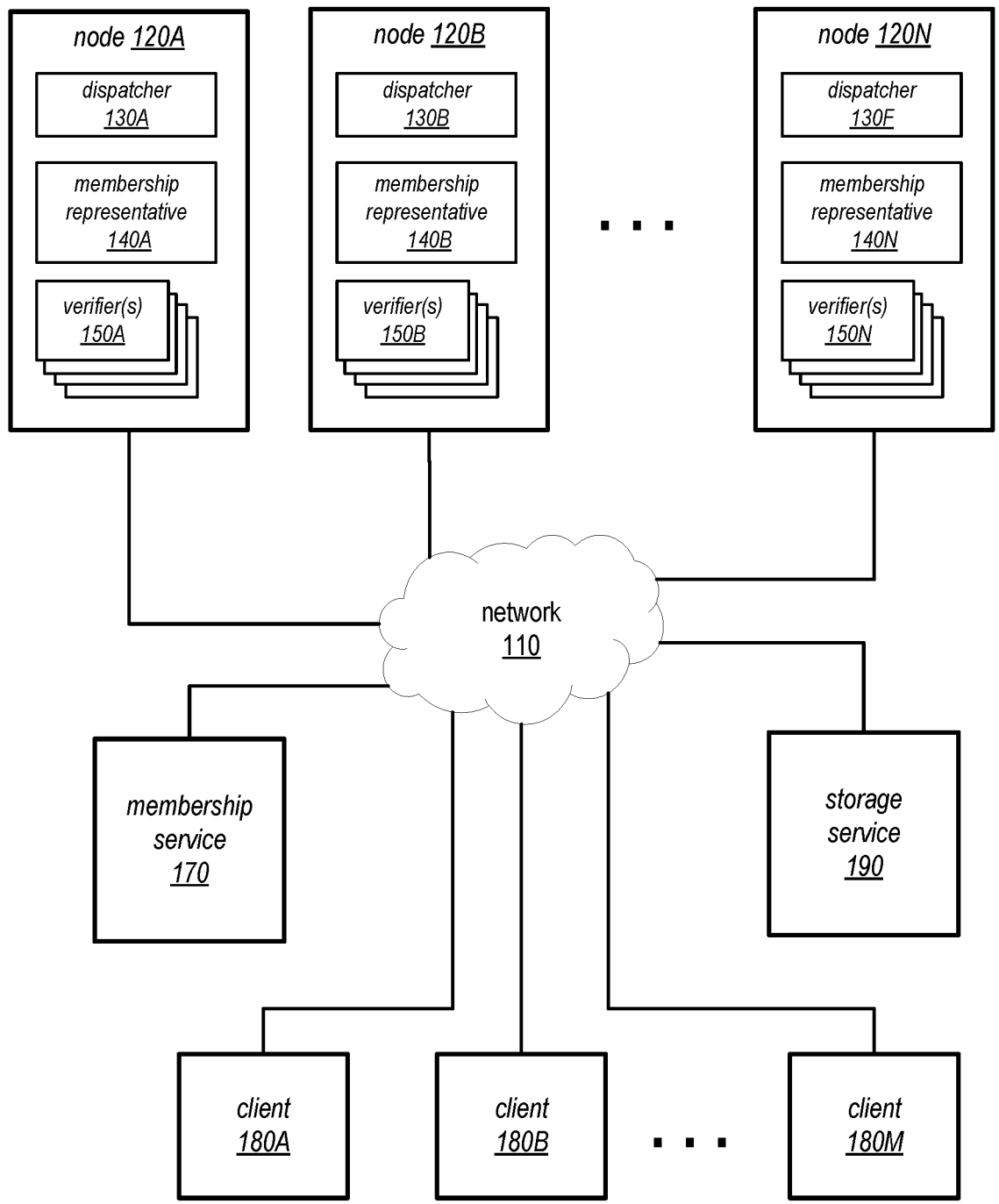
FIG. 1 is a logical block diagram illustrating a system implementing a sharded, permissioned, distributed ledger, according to one embodiment.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Methods, techniques, apparatus and systems for implementing sharded, permissioned, distributed ledger systems are described. In some embodiments, sharded, permissioned, distributed ledgers may reduce the amount of work and communication required by each participant, thus possibly avoiding scalability bottlenecks inherent in previous distributed ledger implementations and enabling the use of additional resources thereby possibly increasing throughput.

In monolithic ledgers (e.g., Bitcoin™ as one example), transactions in the ledger are arranged in a single linear sequence. As a result, monolithic ledgers are generally inherently sequential: every node proposing to add a new transaction to the ledger must compete with every other such node by participating in a common consensus protocol, and the overall system throughput and latency tends to suffer as the number of participants increases.

By contrast, in a sharded ledger, the single ledger may be split into a collection of shards, and each shard may be a linear ledger in its own right. Related transactions may be appended to the same shard, while unrelated transactions may be appended, in parallel, to distinct shards. The ability to append unrelated transactions in parallel allows sharded ledgers to be considered inherently more scalable. Furthermore, each shard may be maintained by a subset of the available resources. Because consensus mechanisms used to maintain a single ledger (or an individual shard in the case of sharded ledgers) often scale poorly with the number of participants, such partitioning of resources between shards may also increase the throughput of each individual shard. Combining the advantages of appending transactions to multiple shards in parallel and increasing the throughput of individual shards may result in substantial throughput improvement compared to a monolithic ledger maintained by the same set of resources.

Simply creating a set of ledgers that are entirely independent of each other, and assigning resources to maintain each of them has several disadvantages that are not shared by a sharded, permissioned, distributed ledgers as described herein. For example, a fixed mapping between ledgers and resources that maintain sets of entirely independent ledgers is inflexible, generally precluding automatic load balancing between ledgers. Furthermore, if the set of resources maintaining each independent ledger remains static, it may be possible for a coalition to form between a sufficient number of these resources that they can corrupt the ledger, for example by agreeing to alter the history of the ledger.

In some embodiments, sharded, permissioned, distributed ledgers may dynamically change the mapping between shards and the resources that maintain them. This may, in some embodiments, enable general policies that perform load balancing, for example, and may also enable the system to regularly reassign resources, thereby potentially confounding efforts to form coalitions between the resources maintaining any given shard. In addition, information about the state of one shard may be included in the ledger of one or more other shards. Including information about the state of one shard in the ledger of another shard may be considered one example of an "entanglement" technique that potentially increases the difficulty of corrupting any given shard, as described in more detail below.

In some embodiments, a sharded, permissioned, distributed ledger may also provide opportunities for supporting cross-shard transactions (i.e., transactions that affect or depend on the state of multiple shards).

Additionally, the methods, techniques and/or mechanisms described herein may be applicable to a variety of blockchain and distributed ledger systems, according to various embodiments.

Implementing a Sharded, Permissioned, Distributed Ledger

As noted above, the methods, techniques and/or mechanisms described herein may, according to some embodiments, split a ledger into multiple shards and arrange for a subset of nodes to maintain each shard, rather than having all nodes communicate with each other to maintain a single ledger. FIG. 1 is a logical block diagram illustrating a system configured to implement a sharded, permissioned distributed ledger, according to one embodiment.

In some embodiments, a sharded, permissioned, distributed ledger may include a plurality of shards, which collectively may represent a complete sharded, permissioned, distributed ledger. Additionally, a shard may be a ledger in its own right. In other words, while including a subset of the information in the overall ledger, a shard may function, and be interacted with, in the same manner as a full ledger.

A system configured to implement a sharded, permissioned, distributed ledger, such as the system illustrated in FIG. 1, may include multiple nodes, such as nodes 120A-N which may be considered participants in the overall ledger system. Nodes 120A-N may be configured to participate in the ledger system via one or more applications, modules, processes, threads, etc., such as via dispatchers 130A-N, membership representatives 140A-N and verifier(s) 150A-N, according to various embodiments. Additionally, in some embodiments, nodes 120A-N may be configured to collectively maintain a sharded, permissioned, distributed ledger, which may be split into multiple shards.

Clients, such as clients 180A-M may communicate over network 110 to interact with the sharded, permissioned, distributed ledger system, such as to submit transactions to be added to the ledger. Network 110 may represent virtually any type of wired or wireless network operating over virtually any type of communication media and according to virtually any communication protocol, according to various embodiments. Additionally, each node 120, may have one or more special "dispatcher" processes, such as dispatchers 130A-N, which may be responsible for directing messages from clients to verifiers in some embodiments. While only a single dispatcher 130 is illustrated per node, in some embodiments, each node may include multiple dispatchers.

The system may, in some embodiments, include a membership and configuration service 170 configured to determine, and/or distribute information regarding, various decisions utilized during execution of the ledger system, such as which nodes may be active on which shards at any given point in time, how many copies of each shard's data should be stored by a storage service, how much advance notice a participant (e.g., a node) should have to prepare before becoming active on a shard, etc. as will be discussed in more detail below. While illustrated as one entity, membership service 170 may, in some embodiments, represent multiple services, such as one for membership, one for node assignment (e.g., to shards) one for system configuration, etc.

In some embodiments, the system may also include a storage service 190 configured to maintain some of all of the data (e.g., transactions) in (and/or associated with) a ledger. Rather than having nodes 120 solely responsible for the data of the shards, a separate storage service 190 may be utilized, as will be described in more detail subsequently. While in some embodiments, shards may be stored on nodes 120A-N, in other embodiments, the shards (and therefore the ledger) of the system may be stored separately from, and on storage devices distinct from, nodes 120A-N, such as within storage service 190. In other embodiments, data for the shards may be stored both on nodes 120A-N and on separate storage devices, such as within storage service 190.

Multiple clients, such as clients 180A-M may interact with a sharded, permissioned, distributed ledger system, such as to submit transactions to be added to the ledger. When a client 180 presents a transaction to the ledger system, the client may specify a shard (i.e., one of the shards making up the ledger) to which that transaction should be directed. A client 180 may indicate a target shard (i.e., the shard to which the transaction should be directed) in any of various manners. For instance, in one embodiment, the communication protocol via which the client 180 communications with the ledger system may provide a mechanism (e.g., a message type, a field, etc.) via which the client 180 indicates a target shard. Additionally, transactions may be assigned to shards in any of various manners, including but not limited to assignments that balance loads across servers, assignments that favor geographically nearby servers, and/or assignments that aggregate related transactions on a single shard. In general, the specific manner and/or mechanism used to assign transactions to shards may vary from embodiment to embodiment.

System Organization and Trust Model

As noted above, each shard may be organized as a ledger that may be maintained similarly to a single-ledger system. For instance, in one embodiment, any node 120 may be assigned to maintain any shard. However, in other embodiments, only a subset of nodes 120A-N may be allowed to maintain any given shard at any given time (e.g., such as for scalability). Described herein are various techniques for determining which nodes participate in maintaining which shards at which times within a system implementing a sharded, permissioned, distributed ledger.

A system implementing a sharded, permissioned, distributed ledger may protect against an adversary trying to disrupt or corrupt the ledger. For ease of discussion, each node may be considered to be under the control of one entity, and it may further be assumed that the adversary can corrupt at the granularity of individual nodes. For instance, if one process of a node is corrupted, then all processes at that node may misbehave. Conversely, processes on a single node may be considered to trust one another, while processes on different, distinct nodes may not.

While described herein in terms of a system in which each node has a single verifier process for each shard, in some embodiments a sharded, permissioned, distributed ledger system may be implemented such that each node may have a thread for each shard. In yet other embodiments, processes and/or threads may maintain different shards at different times. Thus, in some embodiments, a sharded, permissioned, distributed ledger system may include multiple nodes, such as nodes 120A-N, each of which may include a process, such as verifier(s) 150A-N, for each shard. Additionally, each verifier 150 may participate in maintaining only the shard on which it is active.

Figure 2:
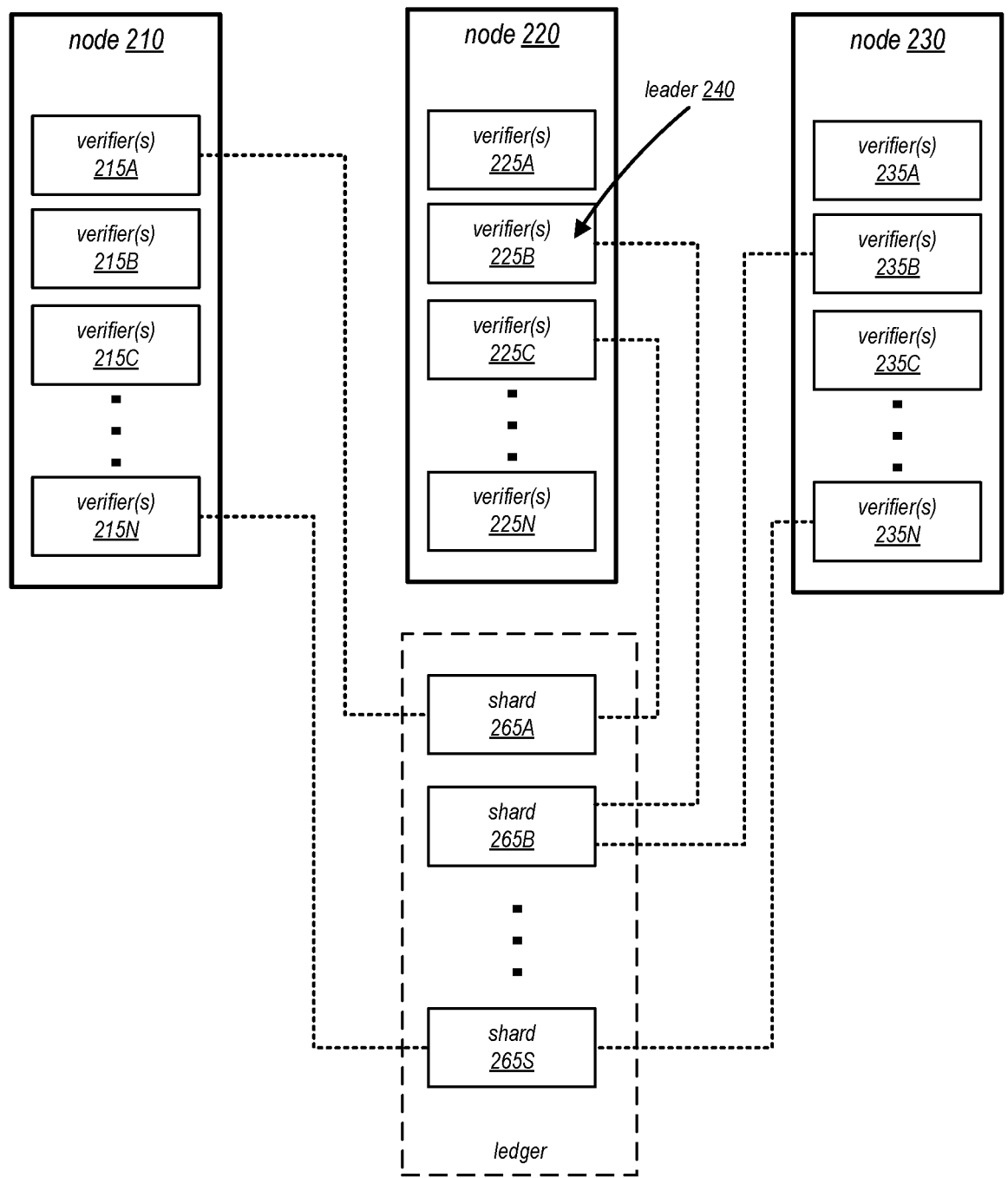
FIG. 2 is a logical block diagram illustrating verifiers on several nodes responsible for maintaining shards of a sharded, permissioned, distributed ledger, according to one embodiment.

FIG. 2 is a logical diagram illustrating verifiers participating in maintaining the shards to a sharded, permissioned, distributed ledger, according to one embodiment. Illustrated in FIG. 2 are nodes 210, 220 and 230, which may in some embodiments, be the same as (or represent) individual ones of nodes 120A-N. Please note while only three nodes are illustrated for ease of discussion, in some embodiments, many more nodes may be included, and may participate within, a shared, permissioned, distributed ledger system as described herein. Additionally, while not illustrated, nodes 210, 220 and 230 may include other applications, modules, processes and/or thread, such as dispatchers, membership representatives, etc.

At any given time, a node may be active or inactive for a given shard. If a node is active for a given shard, as indicated by a dotted line from a verifier to a shard, that node's verifier process for that shard participates in consensus to append new transactions to the shard's ledger. For example, verifier 215A of node 210 may be active for shard 265A, as indicated by the dotted line from verifier 215A to shard 265A. Similarly, verifier 215N may be active for shard 265S as indicated by the dotted line from verifier 215N to shard 265S. Additionally, various ones of verifiers 225A-N of node 220 and verifiers 235A-N of node 230 may be active on individual ones of shards 265A-S, as indicated by the dotted lines from verifiers to shards. Please note that the logical arrangement of verifiers and shards as illustrated is for ease of discussion and may not represent any actual physical arrangement of nodes, verifiers and/or shards.

When maintaining a shard, the active verifiers for the given shard may follow any of various approaches and/or consensus protocols. For example, in one embodiment, the verifiers of nodes 210, 220 and 230 (and/or of nodes 120A-N) may follow a consensus algorithm based on a version of Raft that may be "hardened" to tolerate Byzantine behavior (which may be referred to herein as BFT Raft). Thus, in some embodiments, verifiers may follow a consensus protocol (or algorithm) including various measures, such as one or more of the following:

- requiring all messages to be signed by the sender, enabling authentication;
- including incremental hashes of the sequence of transactions, enabling verification that nodes agree on the entire sequence of transactions, and making it virtually impossible to revise the history of the ledger without this being apparent to others;
- broadcasting confirmations to all participants, not just the leader.

While these measures may result in $O(n^2)$ message complexity, such a consensus protocol may scale to larger numbers of nodes and achieve higher transaction throughput (e.g., because they enable different nodes to progress at different rates).

Additionally, in some embodiments, a sharded, permissioned, distributed ledger system may include a leader verifier, such as leader 240. For example, in one embodiment, one active verifier may be designated as a leader verifier. The leader 240 may propose new transactions to be appended to the ledger.

Figure 3:
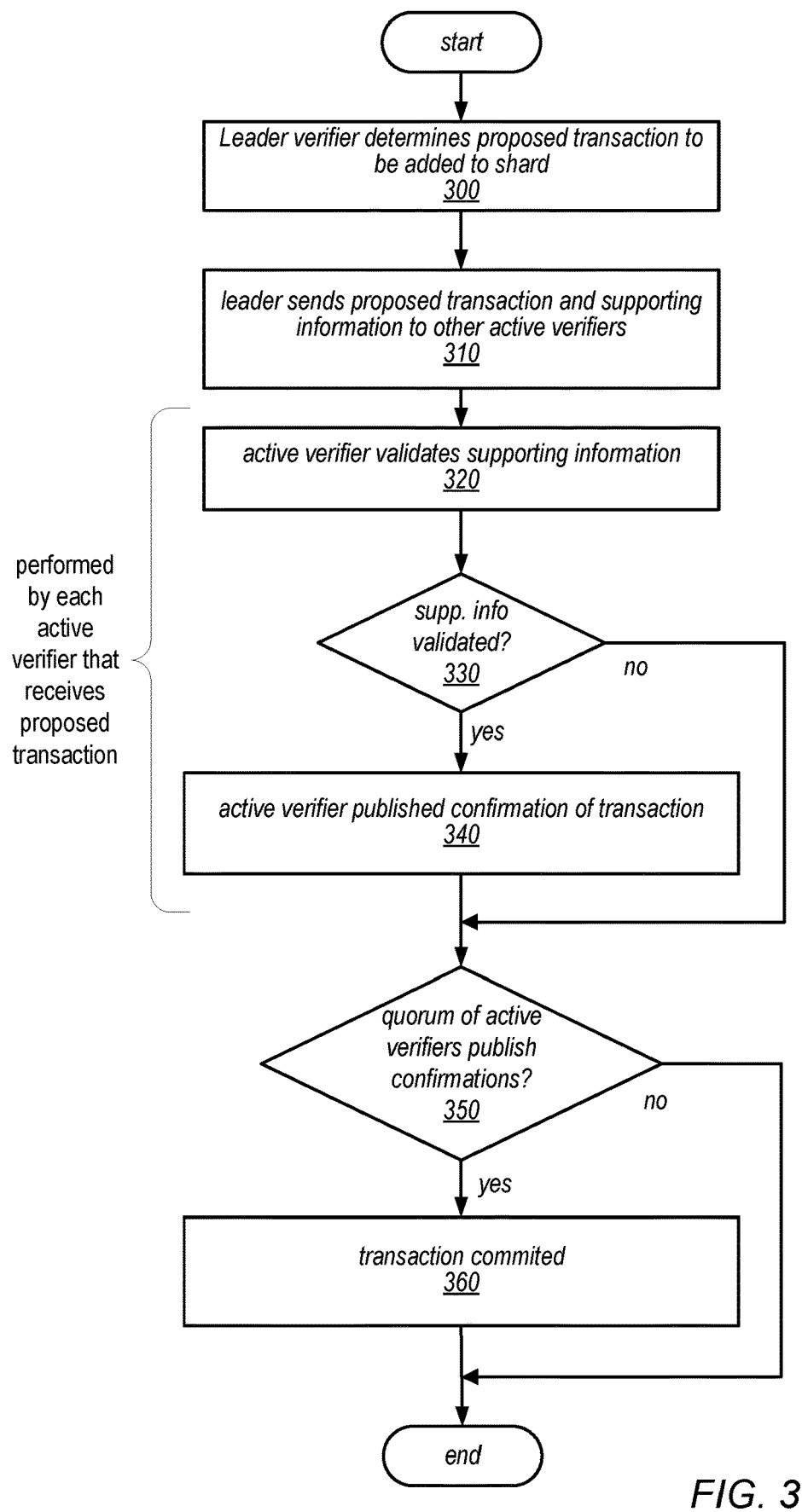
FIG. 3 is a flowchart illustrating one embodiment of a method for adding a transaction to a shard in a sharded, permissioned, distributed ledger.

FIG. 3 is a flowchart illustrating one embodiment of a method for adding a transaction to a shard in a sharded, permissioned, distributed ledger. As illustrated in block 300, a leader 240 may determine a proposed transaction to be added to a shard of the ledger. A leader 240 may determine a proposed transaction in any of various ways, such as by receiving a transaction submitted by a client, according to various embodiments. The leader 240 may propose new transactions to be appended to the ledger by sending the proposed transaction, as well as supporting information (e.g., such as to validate the leader's authority and/or authenticity) to other active verifiers, as in block 310. For instance, in some embodiments, a leader may utilize supporting information including information indicating (or representing) the votes showing its legitimacy as leader, the ledger index after which the new transactions should be appended, etc. The verifiers receiving the proposed transactions may check that the transactions and supporting information are valid as in block 320. If the supporting information (and/or other aspects of the proposed transaction) are valid, as indicated by the positive output of decision block 330, the verifier may publish a confirmation of that fact, as illustrated in block 340. Each verifier (e.g., that is active on the target shard for the transaction and/or that receives the proposed transaction) may independently validate the proposed transaction and/or supporting information from the leader 240 and publish a confirmation. In some embodiments, leader 240 may also publish a confirmation (e.g., to be consistent with other verifiers), but in other embodiments, the sending of a proposed transaction may represent a confirmation by the leader 240.

In some embodiments, a node may consider a proposed transaction committed once it has received confirmation from a certain number of active verifiers, as indicated by the positive output of decision block 350 and block 360. Thus, a node may also consider transactions in the ledger up to a given index to be committed when it has received such confirmations for a transaction at that index from a quorum of active verifiers. Additionally, in some embodiments, all transactions at lower indexes may also be considered committed.

A quorum may be considered any majority of the active nodes on the shard, according to some embodiments. While FIG. 2 shows only two active verifiers per shard (i.e., for ease of illustration and discussion), in other embodiments an odd number of verifiers per shard may be used so that a clear majority may be achieved. Thus, once a quorum of active nodes confirms a proposed transaction as the next transaction in the ledger, it may not be possible for another quorum to confirm a different transaction at that index (unless at least one active verifier signs conflicting confirmations, which provides undeniable proof that it is cheating).

A quorum of active verifiers may in some embodiments depose a leader and elect a new one in case the current leader misbehaves or becomes unresponsive. When deposed by a quorum of verifiers, the original leader's term is considered complete and another term begun with a new leader.

The message complexity associated with adding transactions to the shard may be considered to depend on the number of active nodes for that shard rather than on the overall number of nodes in the system. This may enable multiple shards to operate in parallel, and may further allow each shard to achieve higher throughput than a single shard maintained by all nodes, according to some embodiments.

Dispatchers

Figure 4:
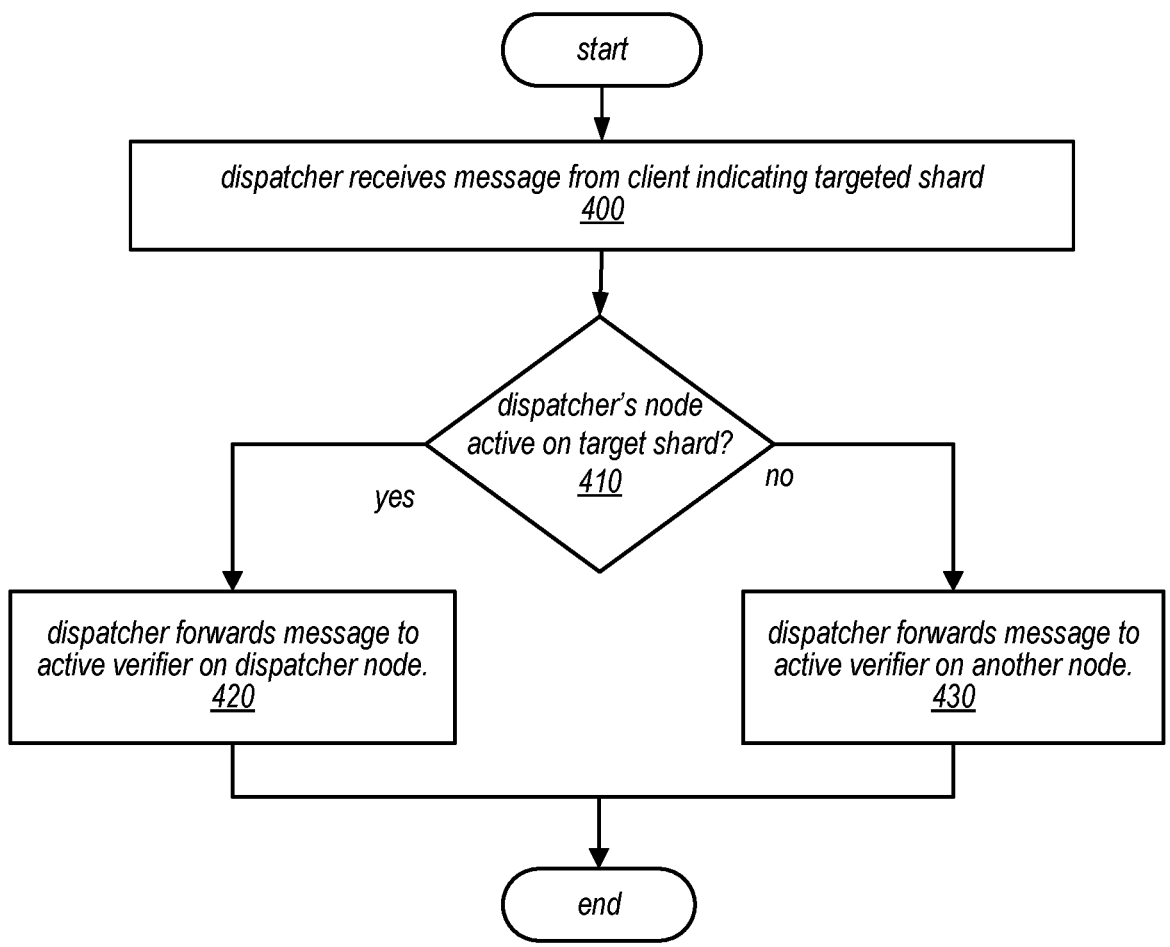
FIG. 4 is a flowchart illustrating one embodiment of a method for dispatching received messages.

As noted above, each node may have one or more dispatcher processes, such as dispatchers 130A-N, which may be responsible for directing messages from clients to active verifiers. FIG. 4 is a flowchart illustrating one embodiment of a method for dispatching received messages. A dispatcher 130 may receive a message from a client indicating a target shard, as in block 400. In some embodiments, dispatchers 130A-N may receive transaction requests from clients 180A-M. A request from a client may specify a target shard as well as a command and/or transaction (e.g., a proposed transaction to be added/applied to the target shard). A dispatcher may be responsible for forwarding a received request to a process, such as a verifier 150, that is active on the target shard. If a verifier on the same node as the dispatcher (e.g., the node on which the dispatcher is executing) is active on the target shard (e.g., is responsible for maintaining the target shard), as indicated by the positive output of decision block 410, the dispatcher may forward the request to a process (e.g., a verifier) on the dispatcher's own node, as in block 420.

If no verifier on the same node as the dispatcher is active on the target shard, as indicated by the negative output of decision block 410, the dispatcher may send the request to a process (e.g., a verifier) on another node (i.e., remote from the dispatcher's own node) that is active on the target shard, as in block 430. In some embodiments, it may not be required that dispatchers be perfectly accurate in forwarding every request to an active verifier. Nonetheless, unnecessary forwarding may be avoided by doing so as often as possible.

In some embodiments, dispatchers may maintain state information to support identification of processes that are active for a target shard. In some embodiments, this state information maintained by dispatchers may comprise at least: a set of processes, such as verifiers, that maintain the given shard; a subset of those processes that are currently active for the shard; and/or the identity of the process on the dispatcher's own node that maintains the shard. A system configured to implement a sharded, permissioned, distributed ledger may identify processes, verifiers and/or shards in any of various ways, according to various embodiments. For example, in one embodiment, unique identifiers may be associated with each process, verifier, shard, etc. and these identifiers (names, numeric IDs, alpha-numeric IDs, etc.) may be utilized within state information. In other embodiments, pointers (e.g., programmatic memory pointers) may be used to identify, locate and/or communicate with processes, verifiers, shards, etc.

A dispatcher may utilize state information to forward a request locally if there is a local process that is active on the target shard. If there is no local process that is active on the target shard, the dispatcher may use the state information to identify a remote process that is active on the target shard. In some embodiments, state information may be maintained locally on the dispatcher's own node, while in other embodiments, dispatcher may rely on state information stored remotely (but accessible). State information regarding active verifiers and shards may be updated in response to directives from a membership service, according to various embodiments.

Shard Assignment

In some embodiments, active processes for each shard may be determined at initialization time and may remain static throughout the lifetime of the system. However, in some embodiments, using static process assignments may have several shortcomings, such as:

Not allowing shards to be added.

Not allowing nodes to be added.

Not allowing replacement of active participants on a shard (e.g., such as if they become unresponsive or are observed misbehaving).

The same set of nodes remain active on any given shard all the time, allowing for the possibility of establishing coalitions between dishonest nodes maintaining a given shard.

In other embodiments, nodes (and/or verifiers) may be assigned to shards dynamically.

In various embodiments, various schemes may be used to determine when processes become active on their shards. For example, in some embodiments, processes, such as verifiers, may follow a fixed schedule of activation on shards. For example, a verifier that is active on a given shard may become inactive on that shard if/when the shard's ledger reaches a certain length. Note, however, that in some embodiments, an inactive process/verifier may not be able to immediately become active when conditions (such as the ledger reaching a certain length) require it to do so, because it may be unaware of these conditions. Instead, in some embodiments, a process/verifier may be "woken up" and informed that it is now active on a given shard. In some embodiments, waking up process may be performed by another active process, such as one that is about to become inactive on the shard. In other embodiments, dispatchers may be informed of relevant events (such as a shard reaching a threshold length), which may cause them to update their state information accordingly, and to awaken and/or inform a process that it is now active. A newly-active process may also be woken by receiving a message from another process that is active on the shard that knows the shard has reached the threshold length (e.g., a threshold that triggers the process to become active). In yet other embodiments, a process may be informed that it has become active on a shard by a participant in membership service 170.

Instead of activating processes/verifiers on fixed schedule (e.g., when a ledger reaches a certain number of transaction), in some embodiments, processes/verifiers may become active/inactive based on regular reassignments that may be influenced by combinations of various information, including any or all of:
- information about the load on the shard;
- information about the availability and responsiveness of processes that are active on that shard;
- information about (suspected) misbehavior of processes that are active on that shard; and
- information about policy inputs, such as service level requirements, constraints, etc.

In some embodiments, it may be important that participants (e.g., nodes, processes, verifiers, etc.) not be able to control shard assignments. Otherwise, a group of nodes might be able to conspire to achieve sufficient active participation in a shard that they can outvote all other active participants in the shard, thus effectively gaining the ability to control that shard (e.g., for self-serving and/or illegal purposes). For this reason, in some embodiments, shard assignment decisions may be driven by policies that are implemented as deterministic functions of random (e.g., pseudo-random) sequences that cannot be controlled by participants, possibly along with additional information.

The use of random information for shard assignment decisions may prevent an adversary (e.g., a misbehaving node) from consistently making choices that may enable it to gain control of one or more shards, and may also provide accountability. For example, any attempt to diverge from the choices dictated by the deterministic policy and randomness source may be detected (i.e., either immediately or after-the-fact) and the dishonest node may be held accountable.

In general, a source of randomness, such as a source of cryptographic randomness, may be utilized in any of various ways for deterministic shard assignment policies. Some examples include, according to various embodiments:
- a policy that periodically chooses a shard at random, chooses one process that is active on the shard, and makes it inactive, and then randomly chooses a shard for which the same node's process is inactive, and makes it active;
- a policy that repeatedly selects two shards at random, then selects a pair of nodes that are active on different shards and exchanges these roles; and/or
- a policy that periodically generates a new system-wide assignment satisfying whatever policy is desired (for example, ensuring that each shard has sufficient active processes, and that load is balanced evenly across nodes).

The first example policy above may keep the number of shards on which a given node is active constant, while creating some turn-over (or "churn") in active shard assignments. However, in some embodiments, it may not guarantee that each shard will always have sufficient active nodes to make progress and tolerate a specified number of Byzantine nodes on each shard. The second example policy above may preserve the load on each node as well as the number of active processes per shard.

In general, there may be trade-offs, challenges and/or constraints that may affect the choice of policy that is most effective for a particular purpose and according to various embodiments. For example, if reassignment is not frequent enough, nodes participating on a given shard may have an opportunity to form a coalition, and may attempt to take control of the shard. On the other hand, in some embodiments reassigning processes to shards may entail various overheads. For example, if a process has been inactive on a shard, it will not have up-to-date information about the recent transactions, and may need to communicate to get this information before it can begin participating in appending new transactions, in some embodiments. Therefore, it may be undesirable to reassign processes too frequently.

Parameters, such as the number and frequency of shard reassignments, may vary from embodiment to embodiment. For instance, in one embodiment, such parameters may be determined by initialization time parameters, while in other embodiments, such parameters may vary based on various inputs, such as observed load (e.g., number of transactions) on a shard, and/or accountability information, such as when a threshold number of active participants on a shard report that another active participant is unresponsive or has misbehaved.

Preparing Soon-to-be-Active Processes

To participate in consensus to add more transactions to a shard, an active process on a node may need to be up-to-date with the previous transactions for that shard. This may be necessary so that the node can validate transactions in context of all previous transactions. Additionally, in some embodiments, an active process may need to be up-to-date so that it can use the cryptographic hash of the most recent transaction in constructing the new transaction (e.g., such as to help ensure that the ledger is tamperproof). If the process was previously inactive, it may lack some or all transactions for the shard (for which it is now active).

A participant (e.g., a verifier) may become up-to-date according to any of several approaches, in various embodiments. For example, in some embodiments the consensus algorithm (e.g., such as the BFT Raft consensus algorithm) may have provisions for a participant that is behind to "catch up" to other participants that are further ahead. However, a significant delay may be incurred while a participant is acquiring all necessary transactions (e.g., while catching up), especially if a node has been inactive on a shard for a long time.

Alternatively, in other embodiments, verifiable shard "snapshots" may summarize the state of shards at various points, thereby possibly enabling a newly-active verifier to adopt the snapshot without having to replay all transactions for the shard since it was last active on the shard (or all transactions for the shard if the verifier has never previously been active on this shard). In one embodiment, participants may validate and sign a snapshot and if a sufficient number of participants validate and sign a snapshot it may be guaranteed that at least one of them is honest.

Figure 5:
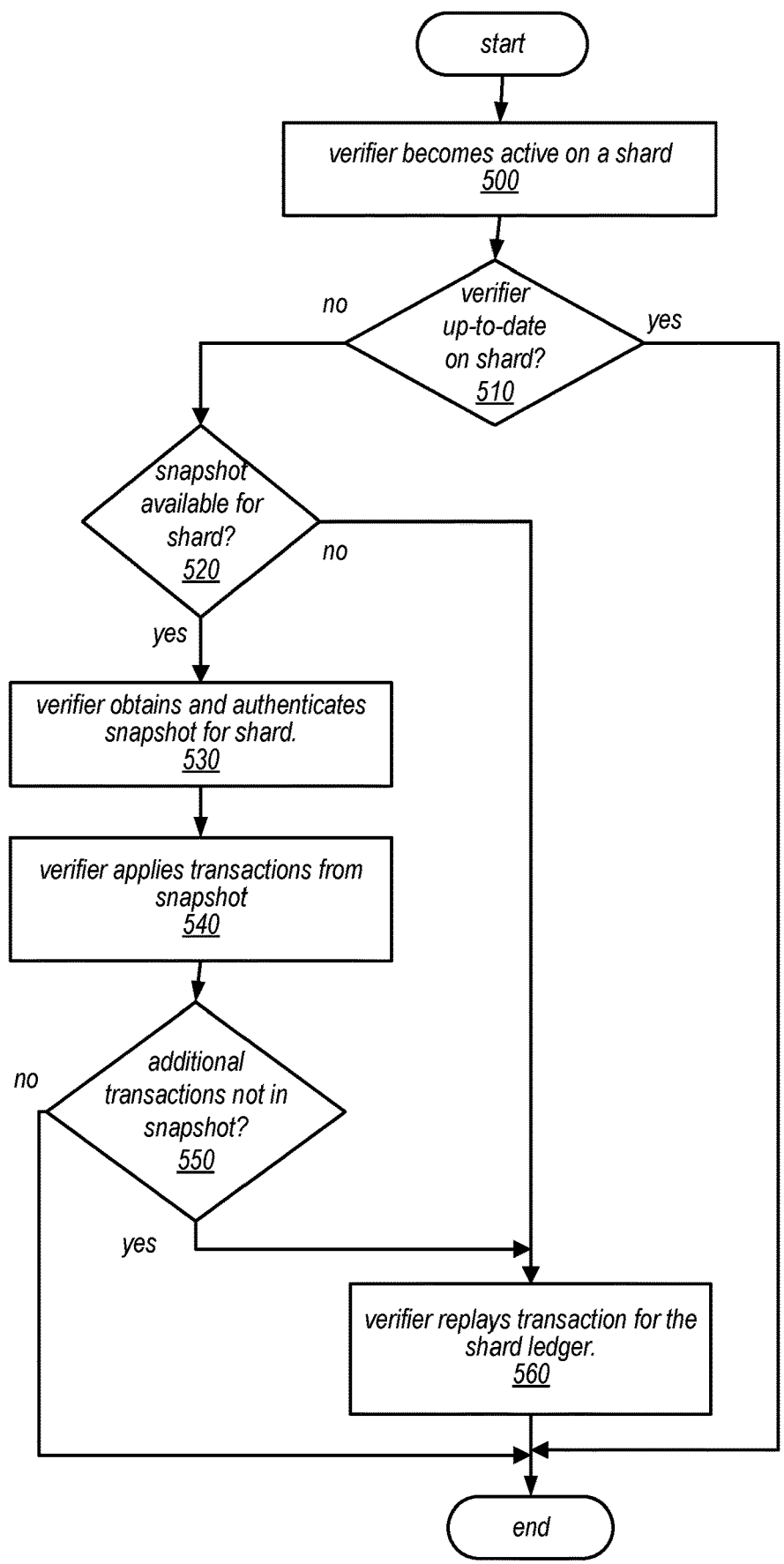
FIG. 5 is a flowchart illustrating one embodiment of a method for utilizing shard snapshots when verifiers become active.

FIG. 5 is a flowchart illustrating one embodiment of a method for utilizing shard snapshots when verifiers become active. When a verifier becomes active on a given shard, as in block 500, if the verifier is not up-to-date on the shard (which may usually be the case) as indicated by the negative output of decision block 510, the verifier may determine whether a snapshot is available for the given shard. For example, the verifier may have become active before a snapshot has been generated for the given shard and therefore no snapshot may be available. If a snapshot is not available for the shard, as indicated by the negative output of decision block 520, the verifier may replay the previous transactions for the shard ledger, as in block 560. When replaying transactions for a shard ledger, a verifier may obtain the transaction in any of various ways, such as by requesting the additional transaction data it needs from recently-active verifiers or from a storage service 190, according to various embodiments. In other embodiments, transaction or snapshot data might be sent proactively by other verifiers and/or participants (such as participants in the storage service) in response to observing that a verifier has (or will) become active.

Alternatively, if there is a snapshot available, as indicated by the positive output of decision block 520, the verifier may obtain and authenticate the snapshot for the shard, as in block 530. A verifier may obtain, or access, a snapshot in any of various manners, according to various embodiments. In one embodiment, the snapshot (or a copy of the snapshot) may be stored on the verifier's own node. In other embodiments, the verifier may be configured to request, and/or access, the snapshot from a remote node, or from a storage service 190.

Additionally, the verifier may authenticate the snapshot, such as by checking that at least a certain number of other participants have validated and signed the snapshot, according to some embodiments. In some embodiments, "evidence" may be stored with transaction or snapshot data to enable recipients to verify its accuracy. Such evidence may include signatures of verifiers that have voted for transactions or snapshot, cryptographic hashes and/or Merkle proofs that enable the receiving verifier to check that the transactions or snapshots are valid. The verifier may then apply the transactions from the snapshot as in block 540.

If, as indicated by the positive output of decision block 550, there are additional transactions for the shard that are not included in the snapshot, the verifier may replay those transactions from the shard, as in block 560. For example, additional transactions may have been committed to the shard during the time that the verifier is obtaining and using the snapshot.

As noted above, while the snapshot approach may reduce the time required to catch up, it may not eliminate it entirely because obtaining and validating the snapshot may take time, and there may be transactions to apply after the snapshot before the verifier has caught up sufficiently to begin participating in adding new transactions. Therefore, in some embodiments, a system configured to implement a sharded, permissioned, distributed ledger may be configured to provide processes/verifiers with advance warning that they will become active on a shard in the near future. Thus, in some embodiments a process may be able to begin catching up before it is required to become active on a given shard. For example, a verifier might request the additional transaction data it needs from recently-active verifiers or from a storage service 190.

If future participation is known too far in advance, it may create opportunities for malicious coalitions to form in some embodiments. On the other hand, if insufficient notice is given, there may be delays while newly-active nodes/verifiers acquire the data they need in order to begin participating (e.g., while they catch up). In general, the amount of notice given may vary from embodiment to embodiment. For instance, the amount of notice given may be based on initialization-time parameters and/or may be dynamically adapted/adjusted based on observations (e.g., such as how long it takes nodes to catch up before their active participation begins), according to various embodiments.

Storage

In traditional, monolithic, blockchain systems, all participants may receive, validate, and store all transactions and related metadata (such as blocks, block headers, snapshots, etc.). In some embodiments, a sharded, permissioned, distributed ledger system, non-active verifiers may not maintain an up-to-date record of transactions, so when they become active again, there may be a delay while they catch up, as described above. In other embodiments, inactive nodes and/or verifiers may be kept up-to-date by having active nodes broadcast transactions after consensus on them is complete (e.g., when a transaction is committed to a shard). In such embodiments, an active node might store signed (e.g., authenticated) messages that are received from other active participants as part of the consensus process.

Additionally, transactions that are broadcast to non-active verifiers may be accompanied by proof that consensus was reached among participants that were active at the time, according to some embodiments. Thus, in some embodiments all nodes may be kept (at least relatively) up-to-date with all shards while still limiting consensus-related communication to the group of active participants, which may include fewer than all participants. However, proactive broadcasts to non-active verifiers may result in additional storage and processing overhead, such as all nodes storing and doing at least some processing on all transactions for all shards.

In order to reduce the amount of additional overhead incurred by broadcasting to non-active verifiers, the set of shards for which any given node may become active may be limited. For example, a node may never participate in shards outside a particular set of shards, and therefore may never need to store and process their transactions (e.g., transactions for shards not in the particular set). In some embodiments, limiting nodes to particular shards may be desirable in large networks with many nodes and many shards, such that there are still enough nodes available to participate in any given shard, enabling regular reassignments to foil collusion attempts.

Additionally, rather than having individual nodes solely responsible for storing shard data and responding to requests (e.g., for snapshots to facilitate a node catching up with a shard), a separate storage service, such as storage service 190, might be used in some embodiments. As with nodes maintaining shards, participants in the storage service might be permissioned, and may be held accountable for being available and/or being able to provide data they have been asked to store.

In some embodiments, a shard verifier that becomes inactive may be required to first ensure that the data (e.g., transaction, consensus, and/or other data) for the shard is made sufficiently available in a storage service 109. For example, the verifier may be configured to send the data to one or more storage nodes of the storage service 190. Additionally in some embodiments, the verifier may also be configured to receive (and/or authenticate) signed confirmations that the data has been stored. Decoupling of storage from processing (e.g., using a separate storage service 190) may, in some embodiments, enable data to be replicated enough times to be highly likely to be available, while possibly avoiding excessive requirements (e.g., such as having all participants store all data).

As with other configurable aspects of a sharded, permissioned, distributed ledger system, parameters such as how many copies of data should be stored by the storage service might be determined by initialization-time parameters, or might be dynamic, driven by deterministic policies that are informed by inputs from participants and/or from authorized administrators, according to various embodiments. One way in which these and other inputs may be collected and used is via a special "coordination shard", discussed below.

Membership and Configuration Service

As noted above, a sharded, permissioned, distributed ledger system may be configured to make various configuration and/or operational decisions, such as regarding which nodes are active on which shards at any given point in time, regarding how many copies of each shard's data should be stored (such as by a storage service), and/or regarding how much advance notice a participant should receive before it is required to become active on a shard, according to various embodiments. Many other possible kinds of decisions may be relevant in various scenarios and embodiments. In some embodiments, a sharded, permissioned, distributed ledger system may include a membership service 170 configured to make such decisions. In some embodiments, membership service 170 may be decomposed into multiple services, such as one a membership service, a service for assigning active nodes to shards, and/or a configuration service. Thus, while described herein as a single service, membership service 170 may include and/or represent multiple different (yet possibly interrelated) services according to different embodiments.

A node may interface with the membership service 170 in a variety of ways. For example, in one embodiment each node may include a special "membership representative" process 140 configured to participate in the membership service 170 and that may communicate with other processes in its node, such as dispatchers and/or verifiers. In some embodiments, membership service 170 may not represent a separate module (e.g., separate from the nodes), but instead membership service 170 may represent a service provided collectively by multiple membership representatives 140 from multiple nodes.

In general, any of various mechanisms may be utilized to implement, communicate with, and/or participate in, a membership service, according to various embodiments. For instance, while illustrated and described herein as separate modules/processes, in one embodiment the roles of dispatcher and membership representative for a node may be combined into a single process.

The membership service 170 may be configured to make various decisions about membership, assignment of which nodes are active on which shards, and/or other system configuration changes, according to various embodiments. Membership representatives may communicate directives based on these decisions to other participants, such as dispatchers and/or verifiers. For instance, in some embodiments membership representatives 140 may be configured to communicate directives to dispatchers, which may be configured to forward relevant directives to verifiers.

In some embodiments, a key requirement of a membership service may be that all honest participants observe the same sequence of decisions (and thus resulting directives). For example, in one embodiment, a deterministic schedule (e.g., fixed at initialization time) may be followed. However, such a fixed deterministic schedule may not be able to react to certain events, such as nodes misbehaving or becoming unresponsive. In another embodiment, deterministic policies may be used that make decisions based on inputs and events, such as reports of un-responsiveness, misbehavior, configuration changes, etc.

Figure 6:
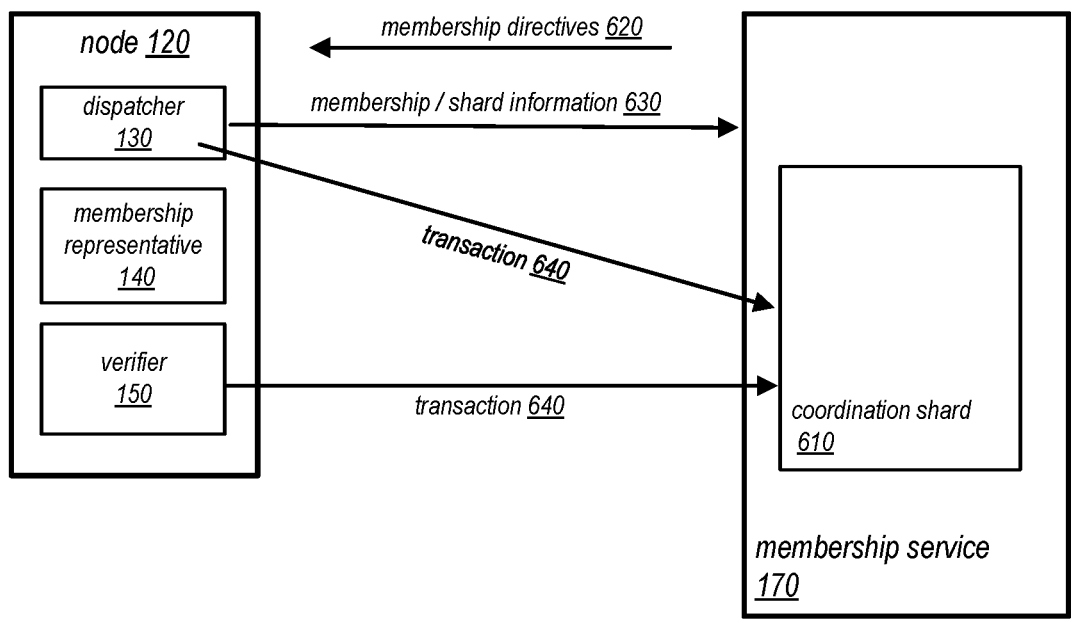
FIG. 6 is a logical diagram illustrating a membership service with a coordination shard, according to one embodiment.

In some embodiments, membership service 170 may include a coordination shard, which may be implemented using techniques similar to those for the other shards in the system. FIG. 6 is a logical diagram illustrating a membership service with a coordination shard, according to one embodiment. For example, membership service 170 may include coordination shard 610, which may be configured to record relevant inputs and events, such as membership/shard information 630 (e.g., so that all honest participants have the same view of the inputs and events), thereby possibly allowing participants in the coordination shard 610 to communicate membership directives 620, such as possibly based on a deterministic policy that takes these inputs and events as input.

As one example, consider a simple scheme for determining which nodes are active on which shards by replacing one active participant on each shard after every T transactions on that shard. To this end, the coordination shard 610 may be informed when a shard s, such as shard 265, completes T transactions. This may be via a transaction 640 submitted to the coordination shard 610 by a participant, such as verifier 150, that is active on shard s. Alternatively, verifier 150 may inform their local (and therefore trusted) dispatcher 130 of progress on their shard 265 and the dispatcher 130 may communicate relevant events to the membership service 170 (which may then submit the events to the coordination shard). Additionally, in some embodiments a dispatcher 130 may submit a transaction 640 to the communication shard 610, while in other embodiments, a dispatcher 130 may communicate with the local membership representative, which in turn may communicate membership/shard information 630 to membership service 170 and/or to coordination shard 610. In some embodiments, transaction 640 may include an indication that the shard 265 had committed T more transactions, and may also include an indication of one or more votes of nodes currently active on the shard as evidence that the transactions have been committed.

In some embodiments, additional information may be submitted to the coordination shard 610, such as via transactions. Such additional information may include, without limitation:

Observations about other nodes' behavior, including being unresponsive, acting in a way that provably violates the protocol, and/or acting in a way that may be noteworthy even though it does not directly prove misbehavior.

Observations about the shard's load (e.g., the time taken for the most recent T transactions).

Summaries of state information (e.g., possibly concise, unforgeable summaries), such as the net effects of the transactions up to a certain index on a shard, or similar for the stream of directives received from the membership service or other service. These may be considered examples of "entanglement", which is discussed in more detail below.

Directives from specially authorized parties to adjust parameters. For example, a transaction signed by three of five members of a consortium's governance committee, indicating that transactions on that shard should be replicated at least 3 times by the storage service.

Directives from specially authorized parties to add or remove participants from the system.

Directives from specially authorized parties to impose penalties on participants deemed to have misbehaved (perhaps based in part on observations previously included in the coordination shard).

In some embodiments, the system's current configuration at a given point in time, including information such as which participants are active on which shards for what intervals (e.g., a participant might be active on a shard from transaction N until transaction N+T on that shard) may be a deterministic function of, or may be based on, information in the coordination shard's ledger. Thus, if/when a certain number of honest nodes agree on the state of the coordination shard's ledger, they may be considered to have a common derived view of the system's configuration.

Which processes and/or the number of processes that may participate in coordination shard 610 may vary from embodiment to embodiment. In one embodiment, all verifiers and dispatchers may participate, such as if configuration changes are infrequent enough. In other embodiments, dispatchers at each node may participate, while in other embodiments, only an active subset of dispatchers may participate. Active assignments, or which processes may be active on the coordination shard, may be determined similarly to the manner in which this is achieved for regular shards, according to some embodiments. In general, the manner in which processes are assigned (or become active) to participate in the coordination shard may vary from embodiment to embodiment and may depend on various factors, such as frequency of changes, degree of responsiveness required, level of threat, etc.

In some embodiments, it may be necessary for transactions committed on the coordination shard 610 to be broadcast to all membership representatives (and/or dispatchers). For example, it may be necessary to ensure that all honest nodes that are available have up-to-date membership and configuration information, such as may be maintained in the coordination shard. Additionally, it may be desirable in some embodiments to have a larger number of active participants in the coordination shard 610 than in ordinary shards (e.g., shards 265), given the coordination shard's potential importance in controlling various aspects of the entire system. As with other configuration parameters, trade-offs involving the number of active participants in the coordination shard and/or the frequency of transactions submitted to the coordination shard may vary from embodiment to embodiment. For example, configuration parameters related to the coordination shard may be fixed at initialization-time or may be adapted/adjusted dynamically (such as via a deterministic policy acting on inputs and events recorded in the coordination shard).

Additionally, in some embodiments, the coordination shard's role might be implemented by multiple special shards. For example, one special shard might determine which entities are authorized to participate in the system, another might determine which nodes are active on which shards, while another manages configuration parameters, such as the number of transactions to be committed to a shard before a change in active membership occurs. In general, a coordination shard may be implemented in any of various manners, according to various embodiments.

Entanglement

Entanglement, as described herein, may be considered a technique for making sharded, permissioned, distributed ledger systems more difficult to corrupt. For example, entanglement may involve including concise, unforgeable summaries of information from one location in another location. For instance, cryptographic hashes included in transactions (or blocks of transactions) when they are recorded on a ledger may be considered one basic form of entanglement. Cryptographic hashes may make it impossible to change the contents of one block or transaction on the ledger without also changing all subsequent ones (e.g., because each transaction may be based on the cryptographic hash of the previous one).

Entanglement may be used in various other ways beyond this basic form, according to various embodiments. For example, in one embodiment a transaction submitted to one shard may include a cryptographic hash of a current or recent state (e.g., state information) of another shard, thereby possibly ensuring that even if a coalition manages to take control of the second shard sufficiently that it can revise the history of that second shard, this may be detectable (and/or provable) such as by demonstrating that the second shard is no longer correctly summarized by the hash included in the first shard. To cover its tracks, a coalition attempting to revise one shard would also need to take control of and revise one or more other shards that had recorded a summary of the data to be revised. Ensuring regular entanglement with a number of other shards may make it exceedingly difficult to revise the contents of a shard undetectably, even by a coalition that succeeds in taking control of the shard.

Thus, in some embodiments, a verifier may be configured to calculate, determine, or otherwise obtain a cryptographic hash of a current state for a shard and may further be configured to include that cryptographic hash when submitting a transaction to another shard.

In another example, in one embodiment a transaction submitted to a coordination shard (e.g., a shard used to implement a membership service) may include additional information, such as a cryptographic hash or Merkle root of a representation of another shard's state. Such entanglement may be considered to have similar benefits to entangling between multiple regular shards, and/or may be considered to have additional benefits (e.g., such as in case the coordination shard has a larger quorum size, more scrutiny, etc. due to its important role in the system).

In yet another example, a stream of directives sent by membership service 170 to other participants (such as dispatchers 130 and/or verifiers 150) may include (or carry) a cumulative hash (e.g., a hash of all the information in the stream of directives), which may be similar to hashes possibly included with each transaction on a regular shard. Therefore, these hashes may be reported back to the membership service 170 and recorded (e.g., on the coordination shard 610)—possibly as evidence that the stream of directives has been received uncorrupted. In some embodiments, any mismatch in a reported hash may immediately raise an issue and may identify possible misbehaving participants. Conversely, matching hashes received from some, most, or all, participants may be considered to increase confidence that there is no disagreement or ambiguity about what directives have been issued by the membership service 170, according to some embodiments.

In some embodiments, entanglement may be required on a regular basis and the exact nature of entanglement implemented may be driven by policies implemented by the coordination shard 610. As noted above, failure of a participant to comply with entanglement requirements may raise a flag, trigger an investigation, and/or prevent further participation by suspected participants, etc. Additionally, summaries of membership service directives may involve multiple parties, according to some embodiments. For example, in one embodiment directives may be sent to dispatchers 130, and relevant directives may be forwarded by dispatchers 130 to local verifiers 150, and these verifiers 150 may submit transactions (directly or indirectly) to the coordination shard 610, possibly proving that the directives have not been corrupted (such as in transit and/or or by any of the intermediate participants). In some embodiments, per-shard summaries may be computed by the membership service 170 and by verifiers 150, so that verifiers' state may be validated, even though verifiers 150 may only receive directives for their own shard.

Accountability and Trust

As discussed previously, participation in a sharded, permissioned, distributed ledger may be by permission only. Permissioning may therefore create an opportunity for participants to be held accountable in case they misbehave. For example, in some embodiments if a corrupt node that has not been made active on its shard attempts to vote in the shard's consensus anyway, this may be detected by other nodes, who may be able to prove the misbehavior (e.g., by presenting a signed vote for a consensus round along with proof that the sender was not active on the shard for that round). This may result in penalties being imposed automatically by the system and/or by existing mechanisms such as regulatory penalties, lawsuits, etc. Thus, nodes may have a strong incentive to follow the protocol (e.g., a consensus protocol implemented by the system), or at least to avoid any misbehavior that can be detected, especially if it can be proved.

In some embodiments, an active, honest shard participant must be able to tell which other shard participants are active, such as so the honest participant can ignore messages from corrupt, inactive participants pretending to be active. For instance, in some embodiments, an active verifier of an honest node may know at least a subset of the nodes that are active at any given transaction index. Otherwise, a set of corrupt nodes could take over a shard by sending enough votes to form a quorum in the shard's consensus protocol without being authorized to participate in it. As discussed previously, the membership service 170 may be implemented in various ways according to various embodiments, including but not limited to using a special coordination shard 610, a deterministic schedule, or other mechanisms. Furthermore, in some embodiments a membership service 170 may be configured to ensure that all honest membership representatives communicate the same sequence of directives to their respective dispatchers 130 and/or verifiers 150.

For example, if verifier v1 receives a vote from verifier v2 for a transaction at index 1,500, verifier v1 may count verifier v2's vote at index 1,500 after it determines that the membership service has issued an instruction indicating that verifier v2 is active at that index. If no such instruction is available to verifier v1, then verifier v1 may be configured to postpone counting that vote until it receives confirmation that verifier v2 is active at that index, according to some embodiments.

In some embodiments, verifier v2 may be required to provide "evidence" in support of its claim to be active. For example, membership service directives could include "instruction sequence numbers", and verifier v2 may include with its vote the sequence number of a directive making it active for an interval that includes 1,500. When verifier v1 subsequently receives a membership service instruction with that sequence number, verifier v1 may then confirm that this directive indeed makes verifier v2 active for an interval containing index 1,500, and if not, verifier v1 may raise the alarm that verifier v2 has misbehaved by providing invalid evidence with its vote. The inclusion of a directive sequence number with each vote may, in some embodiments, ensure that it is only a matter of time before invalid evidence is identified as such, thus discouraging such misbehavior.

More sophisticated schemes, according to other embodiments, may include more evidence that may enable verifier v1 to confirm a claim without waiting for the specified directive. For example, in one embodiment, the evidence may include a Merkle proof showing that state implied by the sequence of decisions made by the membership service 170 reflects verifier v2 being active on its shard at transaction index 1,500. This may enable verifier v1 to check this proof and be convinced of verifier v2's claim without waiting for additional directives from the membership service.

However, such approaches may be unnecessary in many cases. As discussed above, it may be desirable for participants to have at least some advance notice before they become active. In that case, the above-described situation in which verifier v1 is not yet aware of the decision for verifier v2 to be active by the time verifier v2 is voting may be relatively infrequent. The worst case may be that verifier v1 is not able to count verifier v2's vote (at that point in time). Depending on how many nodes are dishonest and/or how many directives are delayed, this could potentially prevent a node from confirming enough votes to accept a transaction until more directives are received, according to some embodiments.

In some embodiments, verifier v1 may accept verifier v2's claim to be active on face value, such as because verifier v2 knows that if it lies, it may be found out in the future, and possibly penalized and/or otherwise held accountable. In some embodiments, configuration parameters may determine how many such "speculative" votes may be counted. However, in some embodiments counting even one speculative vote may make it possible (even if highly unlikely) that fraudulent votes may cause a transaction to be confirmed without the votes of a quorum of the legitimately active nodes. In some embodiments, this may be completely unacceptable, and therefore a node may be configured to not count a vote before verifying that its sender is legitimately active.

Such verification could be achieved in ways other than simply waiting for the delayed directives to arrive, according to various embodiments. For example, in one embodiment evidence could be stored (e.g., by a storage service 190 and/or by participants in the membership service 170), thereby possibly enabling evidence to be requested on demand. Therefore, following the above example, verifier v2 could may include with its signed vote an identifier (e.g., hash) of evidence proving that it is active, and verifier v1 may be configured to request this evidence in order to verify v2's claim, in some embodiments.

Additional Details and/or Optimizations

In some embodiments, participants may be configured to use any of various techniques to optimize querying data once it has been verified and/or received from a trusted source (e.g., such as directives a dispatcher receives from its membership representative). For example, in one embodiment, a dispatcher may receive a stream of MakeActive directives, each specifying a node, a shard, and an interval (e.g., begin, end). Once each directive has been verified (e.g., minimally by verifying/authenticating the signature of the trusted local membership representative that sent it), that directive may be stored in a local data structure. Storing such directives locally may improve the speed of common operations. In some embodiments, verifiers may be configured to similarly update appropriate data structures when receiving directives (e.g., from the local dispatcher or membership representative) such as to facilitate their common operations.

In some embodiments, an active verifier may be configured to determine which other verifiers are active at the current transaction index on its shard, and may be configured to broadcast consensus-related messages to them. In addition, when receiving a consensus-related message (e.g., such as a vote for a transaction) from another verifier, an active verifier may be configured to confirm that the sender is active for a transaction index specified by the vote, which may not be the same as the receiver's current index.

In some embodiments, queries related to determining which verifiers are active for a current transaction and related to confirming that a sender is active for a specific transaction index may be supported by updating an "interval map" data structure for each instruction received. An interval map may, in some embodiments, support a key-value map in which keys are intervals, and queries can determine which values are associated with intervals containing a specified point, overlapping with a specified interval, etc. In some embodiments, interval maps may be implemented using interval trees.

Continuing the example above, verifier v1 may be configured to maintain an interval map and may further be configured to insert a pair (of values) into its interval map that maps the interval [1000, 2000] to a record identifying verifier v2. When inserting the data into the interval map, verifier v1 may also include other information that is likely to be needed, such as verifier v2's public key (although such information may be available elsewhere, storing it in the interval map may provide faster access to frequently accessed information). Maintaining an interval map may enable verifier v1 to query the interval map with an index for which a vote has been received, thus potentially identifying a set of verifiers that are active at that index, according to some embodiments.

Additional optimizations will be apparent to persons skilled in the art. For example, in some embodiments a verifier may be configured to query the interval map for its current transaction index only once, and cache the result for repeated use when processing consensus-related messages for that index, either invalidating or updating the cached result in case a new directive affects the result. In other embodiments, such optimizations may come "for free", for example due to being implemented in a functional language that memorizes results of functions.

A dispatcher may similarly maintain data structures to speed up its common operations, according to some embodiments. For example, a dispatcher may be configured to maintain a per-shard interval map similar to the one described above for verifiers. However, as described above, a dispatcher's primary role may be to receive transactions from clients and forward them to an appropriate verifier. In some embodiments, it is not necessary for the dispatcher to have (or obtain) precise information about which verifiers are active on each shard. For example, if a dispatcher 130 sends/forwards a message (e.g., a client transaction) to a verifier 150 that is not currently active, the verifier 150 may be configured to forward the message to its local dispatcher 130.

However, for performance reasons it may be desirable in some embodiments, for a dispatcher to identify the active verifiers for a shard. Furthermore, if dispatchers repeatedly send messages to non-active verifiers, which may then send them back to a dispatcher, overall progress in the ledger may be slowed. Thus, in some embodiments, verifiers may be configured to inform dispatchers (e.g. periodically) of the highest transaction index they have seen on their shard, thereby potentially enabling dispatchers to query their interval maps and possibly determine which verifiers are currently active (e.g., with reasonable accuracy).

Randomness

As discussed above, policies and/or decisions for determining which participants are active on which shards at which times—as well as for determining current values of various configuration parameters—may be based, at least in part, on random choices according to some embodiments. Thus, to ensure that such policies are deterministic and can be computed independently by any participant, a shared source of randomness may be required in some embodiments. To avoid manipulation of outcomes of the policy, nobody (e.g., no node or other participant) should be able to control the randomness source. Furthermore, to deny an adversary the opportunity to plan ahead, any random data used should not be known long in advance of when it is needed. Therefore, in some embodiments, it may not be sufficient to choose a random seed at initialization time and use it forever. Instead, in some embodiments, a sharded, permissioned, distributed ledger system may be configured to regularly replace the shared randomness source.

In some embodiments, a randomness source may be used for the duration of a leader's term on the coordination shard, and may be replaced with a new randomness source for the next leader's term. For example, a new seed for a deterministic pseudo-random number generator may be generated for each leader's term, according to one embodiments. However, in general any of various mechanisms for providing randomness may be utilized when implementing a sharded, permissioned, distributed ledger, as described herein according to various embodiments. Additionally, a randomness source may be updated either more frequently (providing more security) or less frequently (requiring less work), may be driven by events other than leadership change (e.g., such as in systems that do not use leader-based consensus), according to various embodiments.

For example, as noted above in some embodiments, randomness may be generated by generating a "good" seed for a deterministic pseudo-random number generator. Clearly, the choice of seed must not be controllable by any participant. Moreover, in some embodiments, the seed may not be predictable too far in advance. If the adversary can tell in advance which of a shard's verifiers will be made active in the distant future, then the adversary can set to work trying to corrupt those verifiers.

In one embodiment, when a leader's term ends, the leader may be configured to take the cryptographic hash of the last transaction committed, which may not be predicted in advance. However, this hash might be manipulated by the leader. For example, a dishonest leader may select and order transactions such that the generated hash has desired properties, such as assigning "friendly" participants to a shard that they would like to corrupt. Therefore, in some embodiments, the current randomness source deterministically assigns a buddy node to each leader. At the end of its term, a leader may then send the buddy node the incremental hash of the last transaction committed and the buddy node may be configured to sign the hash with its own private key and return the signed hash back to the leader, who may then XOR the result with its own signature, thereby resulting in a seed that is not under the control of either party.

Additionally, in some embodiments the leader may be assigned multiple buddy nodes (e.g., at least as many as corrupt nodes that may be tolerated by the system). Provided no more than the assigned number of nodes are corrupt, this may ensure that at least one (either the leader or one of the buddies) is honest and therefore does not engage in "trial and error" collusion. If the random seed is chosen by a function of all signatures (e.g., the XOR of them all), then ensuring a single participant is honest precludes anybody controlling the randomness source, according to some embodiments.

If the leader or any of its buddies fail to participate in this protocol, in some embodiments the leader may eventually be deposed, and a new leader elected. The new leader may then participate in a similar protocol to generate a new random seed in cooperation with its buddy or buddies (which are determined by a function of the previous randomness source). Eventually, in some embodiments it is highly likely that some leader will be found whose buddies all respond and at least one is honest, implying that a new reliable randomness source is generated and the protocol can proceed normally.

While the approach described above may allow a leader to pretend to fail in case the resulting randomness is not to its liking, it will then have no influence over the randomness chosen by the next leader and its buddies. Furthermore, this failure may be visible to others and therefore may contribute to evidence that may be evaluated in case the failure is suspected to be a deliberate attempt to manipulate the outcome.

Example Computing System

Figure 7:
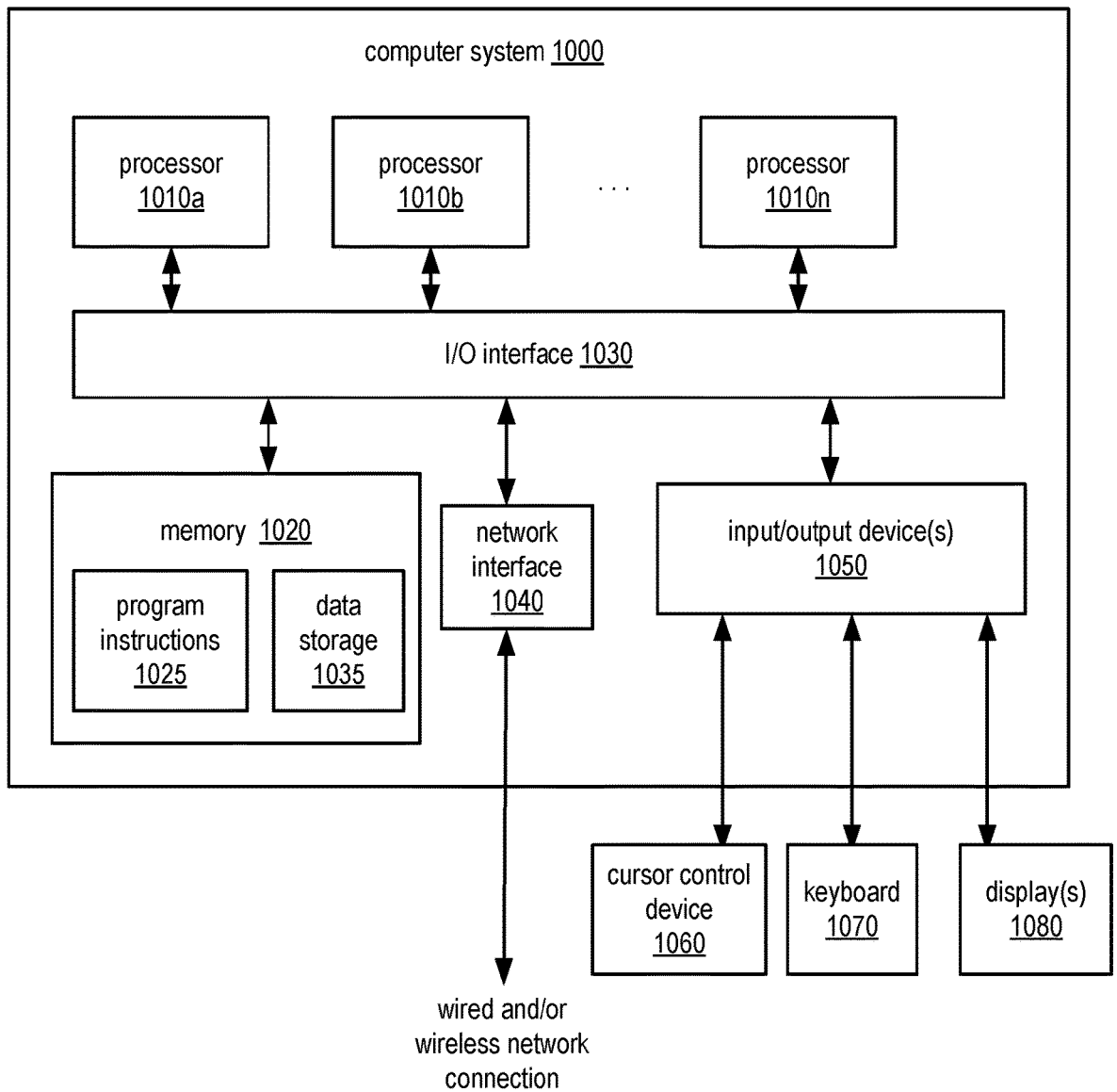
FIG. 7 is a block diagram of a computing device configured to implement a sharded, permissioned, distributed ledger system, according to some embodiments.

Various components of embodiments of the techniques and methods described herein for providing sharded, permissioned, distributed ledger systems may be executed on one or more computer systems or computing devices, which may interact with various other devices. One such computer system or computing device is illustrated by FIG. 7. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions, components, or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of methods for providing enhanced accountability and trust in distributed ledgers including but not limited to methods for processing distributed ledger messages as a sender node and/or as a receiver node as illustrated in FIGS. 2 through 6, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement embodiments of the methods for providing enhanced accountability and trust in distributed ledgers, and data storage 1035, comprising various data accessible by program instructions 1025. In one embodiment, program instructions 1025 may include software elements of embodiments of the methods for providing enhanced accountability and trust in distributed ledgers, as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of the methods for providing enhanced accountability and trust in distributed ledgers as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

The various methods as illustrated in the Figures and described herein represent examples of embodiments of methods. The methods may be implemented in software, hardware, or a combination thereof. The order of the methods may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer implemented method, comprising:
   maintaining, on a plurality of computing devices comprising respective processors and memory and configured to participate as a plurality of nodes in a distributed ledger system, a current configuration of a distributed ledger, the distributed ledger comprising a coordination shard and a plurality of ledger shards;
   receiving, from a node of the plurality of nodes participating in a ledger shard of the plurality of ledger shards, a transaction request directed to the coordination shard, and responsive to the receiving the transaction request:
      updating a state of the coordination shard according to the transaction request; and
      determining a new configuration of the distributed ledger, different from the current configuration, base at least on part on the updated state of the coordination shard.

2. The computer implemented method of claim 1, wherein determining the new configuration of the distributed ledger comprises periodically replacing one or more nodes participating in the ledger shard with one or more respective other nodes of the plurality of nodes.

3. The computer implemented method of claim 1, wherein determining the new configuration of the distributed ledger comprises adding or subtracting one or more nodes participating in respective ledger shards of the plurality of ledger shards to balance respective loads of the respective ledger shards.

4. The computer implemented method of claim 1, wherein determining the new configuration of the distributed ledger comprises exchanging respective roles of a node participating in the ledger shard with another node participating in another ledger shard of the plurality of ledger shards.

5. The computer implemented method of claim 1, wherein the state of the coordination shard comprises an observation that a node participating in the ledger shard violates a ledger protocol, and wherein determining the new configuration of the distributed ledger comprises removing the node from participation in the ledger shard.

6. The computer implemented method of claim 1, wherein the transaction request directed to the coordination shard comprises information of transaction completion on the ledger shard.

7. The computer implemented method of claim 1, wherein the transaction request directed to the coordination shard comprises one or more directives to alter the current configuration of the distributed ledger from one or more authorized parties of the distributed ledger.

8. A sharded, permissioned, distributed ledger system, comprising:
   a coordination shard;
   a plurality of ledger shards; and
   a plurality of computing devices comprising respective processors and memory and configured to participate as a plurality of nodes, wherein a node of the plurality of nodes participating in a ledger shard of the plurality of ledger shards is configured to:
      receive a transaction request directed to the coordination shard; and
      responsive to the receiving the transaction request, update a state of the coordination shard according to the transaction request;
      wherein the distributed ledger system is configured to determine a new configuration of the distributed ledger, different from the current configuration, base at least on part on the updated state of the coordination shard.

9. The sharded, permissioned, distributed ledger system of claim 8, wherein to determine the new configuration of the distributed ledger the distributed ledger system is configured to periodically replace one or more nodes participating in the ledger shard with one or more respective other nodes of the plurality of nodes.

10. The sharded, permissioned, distributed ledger system of claim 8, wherein to determine the new configuration of the distributed ledger the distributed ledger system is configured to add or subtract one or more nodes participating in respective ledger shards of the plurality of ledger shards to balance respective loads of the respective ledger shards.

11. The sharded, permissioned, distributed ledger system of claim 8, wherein to determine the new configuration of the distributed ledger the distributed ledger system is configured to exchange respective roles of a node participating in the ledger shard with another node participating in another ledger shard of the plurality of ledger shards.

12. The sharded, permissioned, distributed ledger system of claim 8, wherein the state of the coordination shard comprises an observation that a node participating in the ledger shard violates a ledger protocol, and wherein to determine the new configuration of the distributed ledger the distributed ledger system is configured to remove the node from participation in the ledger shard.

13. The sharded, permissioned, distributed ledger system of claim 8, wherein the transaction request directed to the coordination shard comprises information of transaction completion on the ledger shard.

14. The sharded, permissioned, distributed ledger system of claim 8, wherein the transaction request directed to the coordination shard comprises one or more directives to alter the current configuration of the distributed ledger from one or more authorized parties of the distributed ledger.

15. One or more non-transitory, computer-readable storage media storing program instructions that when executed on or across one or more computers cause the one or more computers to implement a one or more nodes of a distributed ledger system, performing:
   maintaining a current configuration of a distributed ledger, the distributed ledger comprising a coordination shard and a plurality of ledger shards;
   receiving, from a node participating in a ledger shard of the plurality of ledger shards, a transaction request directed to the coordination shard, and responsive to the receiving the transaction request:
      updating a state of the coordination shard according to the transaction request; and
      determining a new configuration of the distributed ledger, different from the current configuration, base at least on part on the updated state of the coordination shard.

16. The one or more non-transitory, computer-readable storage media of claim 15, wherein determining the new configuration of the distributed ledger comprises periodically replacing one or more nodes participating in the ledger shard with one or more respective other nodes of the plurality of nodes.

17. The one or more non-transitory, computer-readable storage media of claim 15, wherein determining the new configuration of the distributed ledger comprises adding or subtracting one or more nodes participating in respective ledger shards of the plurality of ledger shards to balance respective loads of the respective ledger shards.

18. The one or more non-transitory, computer-readable storage media of claim 15, wherein determining the new configuration of the distributed ledger comprises exchanging respective roles of a node participating in the ledger shard with another node participating in another ledger shard of the plurality of ledger shards.

19. The one or more non-transitory, computer-readable storage media of claim 15, wherein the state of the coordination shard comprises an observation that a node participating in the ledger shard violates a ledger protocol, and wherein determining the new configuration of the distributed ledger comprises removing the node from participation in the ledger shard.

20. The one or more non-transitory, computer-readable storage media of claim 15, wherein the transaction request directed to the coordination shard comprises information of transaction completion on the ledger shard.

\* \* \* \* \*